(12) United States Patent
Witkow et al.

(10) Patent No.: US 7,006,006 B2
(45) Date of Patent: Feb. 28, 2006

(54) SYSTEM AND METHOD FOR CONTROLLING HOME ENTERTAINMENT UNITS WITH RADIO FREQUENCY AND INFRARED SIGNALS

(76) Inventors: Edward H. Witkow, 39747 Forbes Dr., Sterling Heights, MI (US) 48310; Mark A. Hall, 2007 10 Mile Rd., Royal Oak, MI (US) 48067

( * ) Notice: Subject to any disclaimer, the term of this patent is extended or adjusted under 35 U.S.C. 154(b) by 240 days.

(21) Appl. No.: 10/310,063

(22) Filed: Dec. 5, 2002

(65) Prior Publication Data

US 2004/0108940 A1    Jun. 10, 2004

(51) Int. Cl.
*H04B 10/00* (2006.01)
*G08C 19/00* (2006.01)

(52) U.S. Cl. .......................... 340/825.25; 340/825.72; 340/825.69; 398/115

(58) Field of Classification Search .......... 340/825.25, 340/825.69, 825.72, 3.1; 398/115
See application file for complete search history.

(56) References Cited

U.S. PATENT DOCUMENTS

| | | | | |
|---|---|---|---|---|
| 4,718,112 A | * | 1/1988 | Shinoda ................... 455/151.4 |
| 5,583,965 A | * | 12/1996 | Douma et al. .............. 704/275 |
| 5,650,831 A | | 7/1997 | Farwell ...................... 348/734 |
| 5,722,041 A | | 2/1998 | Freadman ................... 455/6.3 |
| 5,802,467 A | * | 9/1998 | Salazar et al. ......... 340/825.72 |
| 5,878,394 A | * | 3/1999 | Muhling ................. 455/151.4 |
| 5,963,624 A | * | 10/1999 | Pope ..................... 379/110.01 |
| 6,008,777 A | | 12/1999 | Yiu ................................ 345/2 |
| 6,097,441 A | | 8/2000 | Allport ....................... 348/552 |
| 6,108,614 A | | 8/2000 | Lincoln et al. ............. 702/183 |
| 6,151,490 A | * | 11/2000 | Schultheiss ................. 455/403 |
| 6,199,136 B1 | | 3/2001 | Shteyn ....................... 710/129 |
| 6,229,433 B1 | | 5/2001 | Rye et al. .............. 340/310.01 |
| 6,359,636 B1 | | 3/2002 | Schindler et al. ........... 345/846 |
| 6,396,544 B1 | | 5/2002 | Schindler et al. ........... 348/461 |
| 6,400,968 B1 | * | 6/2002 | White et al. ................ 455/572 |
| 6,407,779 B1 | | 6/2002 | Herz .......................... 348/734 |
| 6,476,727 B1 | * | 11/2002 | Vogel .................... 340/825.69 |
| 2002/0035404 A1 | | 3/2002 | Ficco et al. .................. 700/65 |
| 2002/0071577 A1 | * | 6/2002 | Lemay et al. ............... 381/110 |

FOREIGN PATENT DOCUMENTS

WO    WO 00/14927    3/2000

* cited by examiner

*Primary Examiner*—Brian Zimmerman
*Assistant Examiner*—Clara Yang
(74) *Attorney, Agent, or Firm*—Richard C. Litman

(57) ABSTRACT

A system and method for controlling home entertainment units with radio frequency and infrared signals. The system includes a computer, a display, an RF transceiving device, an RF transceiver and IR transmitter combination device, and at least one home entertainment unit. The system may also include at least one microphone which may be interconnected with computer via any known connecting cable, or which may be contained within the RF transceiving device and/or the RF transceiver and IR transmitter combination device. The RF transceiver and IR transmitter combination device receives transmitted RF signal data from the RF transceiving device and/or the at least one microphone, converts the RF signal data into IR signal data associated with the particular home entertainment unit, transmits the IR signal data, and controls the particular home entertainment unit.

7 Claims, 2 Drawing Sheets

SYSTEM AND METHOD FOR CONTROLLING HOME ENTERTAINMENT UNITS WITH RADIO FREQUENCY AND INFRARED SIGNALS

BACKGROUND OF THE INVENTION

1. Field of the Invention

The present invention relates generally to systems and methods for controlling home entertainment units and, more particularly, to a system and method for controlling home entertainment units with radio frequency (RF) and infrared (IR) signals.

2. Description of the Related Art

The popularity of electronic home entertainment units, such as televisions (TVs), video cassette recorders (VCRs), digital video disc (DVD) players/recorders, compact disc (CD) players, stereo receivers, tape decks, or the like, has provided an onslaught of remote control devices typically configured for use with a particular home entertainment unit. Such remote control devices are typically operated using IR signals carrying command codes that are internally stored in the associated remote control device. Managing a plurality of such remote control devices readily becomes burdensome due to device placement, device operational differences, device command differences, etc. There is a need for a system and method for controlling home entertainment units with RF and IR signals to simplify the process of conveniently operating a plurality of home entertainment units. The related art is represented by the following references of interest.

U.S. Patent Application Publication No. 2002/0035404 A1, published on Mar. 21, 2002 for Michael Ficco et al., describes a method and system of controlling devices with digitally stored content. The Ficco et al. application does not suggest a system and method for controlling home entertainment units with RF and IR signals according to the claimed invention.

U.S. Pat. No. 5,650,831, issued on Jul. 22, 1997 to Randall Farwell, describes a remote control device for a personal computer based entertainment system. The Farwell patent does-not suggest a system and method for controlling home entertainment units with RF and IR signals according to the claimed invention.

U.S. Pat. No. 5,722,041, issued on Feb. 24, 1998 to Tommyca Freadman, describes a hybrid database interface for remote database access and access coordination within an existing home entertainment system. The Freadman patent does not suggest a system and method for controlling home entertainment units with RF and IR signals according to the claimed invention.

U.S. Pat. No. 6,008,777, issued on Dec. 28, 1999 to Timothy C. Yiu, describes a method and apparatus for remotely interacting with a personal computer. The Yiu patent does not suggest a system and method for controlling home entertainment units with RF and IR signals according to the claimed invention.

U.S. Pat. No. 6,097,441, issued on Aug. 1, 2000 to David E. Allport, describes a system and method for viewing data associated with multiple channels of a television broadcast signal substantially simultaneously. The Allport patent does not suggest a system and method for controlling home entertainment units with RF and IR signals according to the claimed invention.

U.S. Pat. No. 6,108,614, issued on Aug. 22, 2000 to Larry A. Lincoln et al., describes a system and method for serial communication between a central unit and a plurality of remote units. The Lincoln et al. patent does not suggest a system and method for controlling home entertainment units with RF and IR signals according to the claimed invention.

U.S. Pat. No. 6,199,136 B1 and World Intellectual Property Organization Application Publication No. WO 00/14927, issued on Mar. 6, 2001 and published on Mar. 16, 2000, respectfully, for Yevgeniy E. Shteyn, describe a system and method for enabling a high data-rate first control network to control a device in a low data-rate second network. The Shteyn patent and application does not suggest a system and method for controlling home entertainment units with RF and IR signals according to the claimed invention.

U.S. Pat. No. 6,229,433 B1, issued on May 8, 2001 to David J. Rye et al., describes a system for controlling the operation of a plurality of electrically operated devices. The Rye et al. patent does not suggest a system and method for controlling home entertainment units with RF and IR signals according to the claimed invention.

U.S. Pat. No. 6,359,636 B1, issued on Mar. 19, 2002 to Jeffrey Schindler et al., describes an apparatus for controlling the material displayed on a home entertainment system. The Schindler et al. '636 patent does not suggest a system and method for controlling home entertainment units with RF and IR signals according to the claimed invention.

U.S. Pat. No. 6,396,544 B1, issued on May 28, 2002 to Jeffrey Schindler et al., describes a method and apparatus for processing video signals. The Schindler et al. '544 patent does not suggest a system and method for controlling home entertainment units with RF and IR signals according to the claimed invention.

U.S. Pat. No. 6,407,779 B1, issued on Jun. 18, 2002 to William S. Herz, describes a remote control for controlling at least one audio/video device that is connectable to a source of programming including programming guide data. The Herz patent does not suggest a system and method for controlling home entertainment units with RF and IR signals according to the claimed invention.

None of the above inventions and patents, taken either singularly or in combination, is seen to describe the instant invention as claimed. Thus a system and method for controlling home entertainment units with RF and IR signals solving the aforementioned problems is desired.

SUMMARY OF THE INVENTION

The present invention is a system and method for controlling home entertainment units with RF and IR signals. The system includes a computer, a display, an RF transceiving device, an RF transceiver and IR transmitter combination device, and at least one home entertainment unit. The system may also include at least one microphone which may be interconnected with the computer via any known connecting cable, or which may be contained within the RF transceiving device and/or the RF transceiver and IR transmitter combination device. The RF transceiver and IR transmitter combination device receives transmitted RF signal data associated with a particular home entertainment unit, converts the RF signal data into IR signal data associated with the particular home entertainment unit, transmits the IR signal data, and controls the particular home entertainment unit.

Accordingly, it is a principal aspect of the invention to provide a system for controlling home entertainment units with RF and IR signals, the system including a computer, a display, an RF transceiving device, an RF transceiver and IR transmitter combination device, and at least one home entertainment unit, wherein the RF transceiver and IR transmitter combination device receives transmitted RF signal data associated with a particular home entertainment unit, converts the RF signal data into IR signal data associated with the particular home entertainment unit, transmits the IR signal data, and controls the particular home entertainment unit.

It is another aspect of the present invention to provide a system for controlling home entertainment units with RF and IR signals, the system including a computer, a display, an RF transceiving device, an RF transceiver and IR transmitter combination device, and at least one home entertainment unit, wherein the computer, the RF transceiving device, the RF transceiver and IR transmitter combination device, and/or a computer useable medium contains stored therein computer readable software code means, the computer readable software means including: first instruction means for providing a first input window image on a display for obtaining data regarding operation of a home entertainment unit; second instruction means for receiving input data from the first input window via an input device regarding a particular home entertainment unit; third instruction means for receiving input data verbally from an input device via vocal recognition circuitry; the input data regarding a particular home entertainment unit; fourth instruction means for accessing command code data about the particular home entertainment unit associated with the received input data; fifth instruction means for processing accessed command code data for the particular home entertainment unit associated with the received input data; and sixth instruction means for transferring the processed accessed command code data to an RF transceiving device communicatively interconnected with the computer.

It is another aspect of the present invention to provide a system for controlling home entertainment units with RF and IR signals, the system including a computer, a display, an RF transceiving device, an RF transceiver and IR transmitter combination device, and at least one home entertainment unit, wherein the computer, the RF transceiving device, the RF transceiver and IR transmitter combination device, and/or a computer useable medium contains stored therein computer readable software code means, the computer readable software means including: seventh instruction means for receiving processed accessed command code data from a computer communicatively interconnected with the RF transceiving device; eighth instruction means for receiving verbal input data regarding a particular home entertainment unit from an input device via vocal recognition circuitry, and processing the received verbal input data into processed access command code data for the associated home entertainment unit; ninth instruction means for converting processed accessed command code data into RF signal data associated with a particular home entertainment unit; and tenth instruction means for transmitting the RF signal data.

Still another aspect of the present invention to provide a system for controlling home entertainment units with RF and IR signals, the system including a computer, a display, an RF transceiving device, an RF transceiver and IR transmitter combination device, and at least one home entertainment unit, wherein the computer, the RF transceiving device, the RF transceiver and IR transmitter combination device, and/or a computer useable medium contains stored therein computer readable software code means, the computer readable software means including: eleventh instruction means for receiving RF signal data associated with a particular home entertainment unit; twelfth instruction means for receiving verbal input data regarding a particular home entertainment unit from an input device via vocal recognition circuitry, and processing the received verbal input data into received RF signal data for the associated home entertainment unit; thirteenth instruction means for converting received RF signal data associated with a particular home entertainment unit into IR signal data associated with the particular home entertainment unit; and fourteenth instruction means for transmitting IR signal data associated with the particular home entertainment unit to control the particular home entertainment unit.

Yet another aspect of the present invention is to provide a method for controlling home entertainment units with RF and IR signals, the method providing a first input window image on a display for obtaining data regarding operation of a home entertainment unit; receiving input data from the first input window via an input device regarding a particular home entertainment unit; receiving input data verbally from an input device via vocal recognition circuitry, the input data regarding a particular home entertainment unit; accessing command code data about the particular home entertainment unit associated with the received input data; processing accessed command code data the particular home entertainment unit associated with the received input data; transferring the processed accessed command code data to an RF transceiving device communicatively interconnected with the computer; receiving processed accessed command code data from a computer communicatively interconnected with the RF transceiving device; receiving verbal input data regarding a particular home entertainment unit from an input device via vocal recognition circuitry, and processing the received verbal input data into processed accessed command code data for the associated home entertainment unit; converting processed accessed command code data from a computer communicatively interconnected with the RF transceiving device into RF signal data associated with a particular home entertainment unit; transmitting the RF signal data; receiving verbal input data regarding a particular home entertainment unit from an input device via vocal recognition circuitry, and processing the received verbal input data into received RF signal data for the associated home entertainment unit; converting received RF signal data associated with a particular home entertainment unit into IR signal data associated with the particular home entertainment unit; and transmitting IR signal data associated with the particular home entertainment unit to control the particular home entertainment unit.

It is an aspect of the invention to provide improved elements and arrangements thereof in a system and method for controlling home entertainment units with RF and IR signals for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
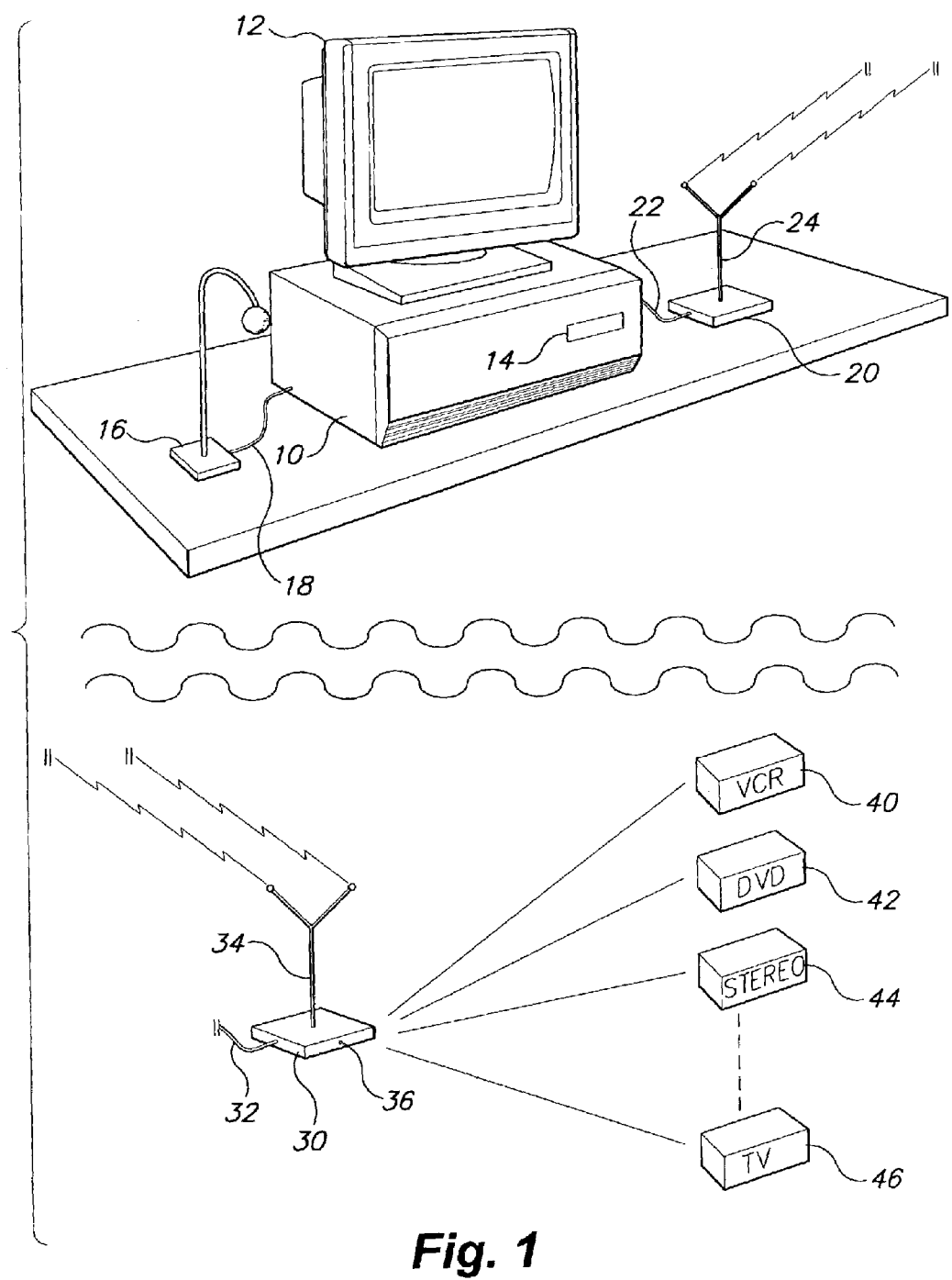
FIG. 1 is an environmental, front perspective view of a system for controlling home entertainment units with RF and IR signals according to the present invention.

The present invention is a system and method for controlling home entertainment units with RF and IR signals. The invention disclosed herein is, of course, susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiments.

Referring to the drawings, FIG. 1 shows a system for controlling home entertainment units with RF and IR signals according to the invention. The system includes computer 10, display 12, RF transceiving device 20, RF transceiver and IR transmitter combination device 30, and at least one home entertainment unit 40, 42, 44, 46. The system may also include at least one microphone 16 which may be interconnected with computer 10 via any known connecting cable 18, or which may be contained within RF transceiving device 20 and/or RF transceiver and IR transmitter combination device 30. Such a microphone 16 may be used for relaying vocal instructional data between computer 10, RF transceiving device 20, and/or RF transceiver and IR transmitter combination device 30 by any well known voice recognition technique and/or protocol.

The system is configured to enable a user to remotely and conveniently control any number of any type of home entertainment units, such as VCR 40, DVD 42, stereo 44, TV 46, or the like. Such control may include any variety of functions, such as programming VCR 40 and/or DVD 42 to record predetermined TV broadcasts at predetermined times, programming stereo 44 to play a predetermined radio station, tape, or CD at a predetermined time at a predetermined volume, changing TV stations on TV 46 at predetermined times, or the like.

Computer 10 may be any known computer for controlling home entertainment units with RF and IR signals. Display 12 may be any known display, such as a cathode ray tube display, a liquid crystal display, a plasma display, or the like. Microphone 16 may be any known microphone. Computer 10 includes a CPU and memory. As shown in FIG. 1, computer 10 also includes a disk drive 14 which may receive data stored on a floppy disk, a CD disk, or the like. Computer readable program code means may be stored or transferred to the memory of computer 10 from an external memory device (e.g. a floppy disk, a CD, or the like) via disk drive 14. The computer readable program code means is read and processed by the CPU, and causes the CPU to perform programmed functions. Movement and process of instructions as well as data is controlled and accomplished by the CPU.

The CPU may execute various programs under the control of the operating system of computer 10. For example, any computer readable software code means stored in the memory of computer 10 or provided by an external memory device may include: first instruction means for providing a first input window image on a display for obtaining data regarding operation of a home entertainment unit; second instruction means for receiving input data from the first input window via an input device regarding a particular home entertainment unit; third instruction means for receiving input data verbally from an input device via vocal recognition circuitry, the input data regarding a particular home entertainment unit; fourth instruction means for accessing command code data about the particular home entertainment unit associated with the received input data; fifth instruction means for processing accessed command code data the particular home entertainment unit associated with the received input data; and sixth instruction means for transferring the processed accessed command code data to an RF transceiving device communicatively interconnected with the computer.

Figure 2:
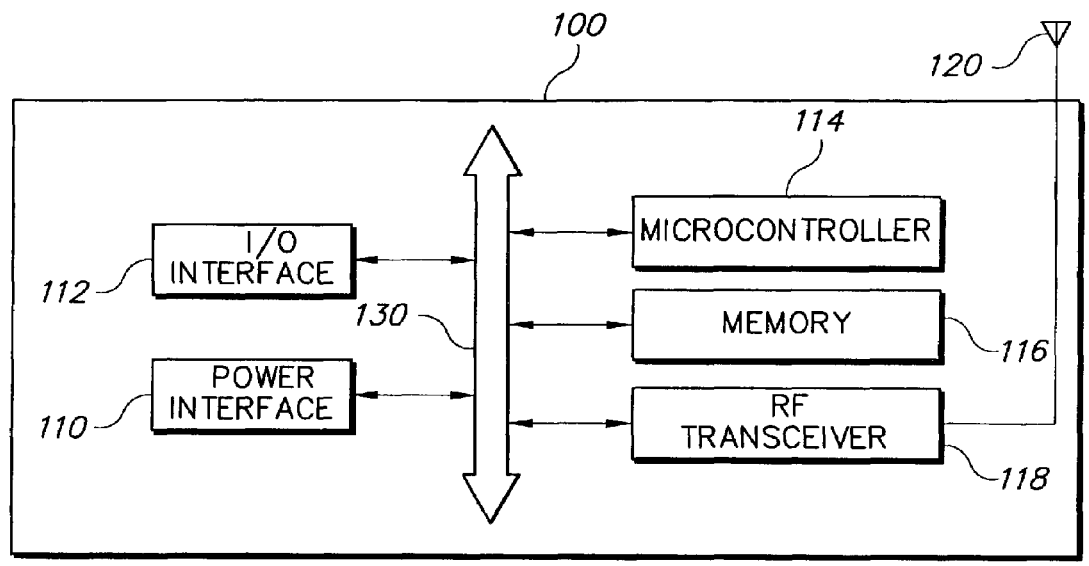
FIG. 2 is a block diagram of an RF transceiving device according to the present invention.

RF transceiving device 20 is communicatively interconnected with computer 10 by cable 22 (e.g., via an RS232 port or the like), and is wirelessly communicatively linked with RF transceiver and IR transmitter combination device 30 via antenna 24 of RF transceiving device 20 and antenna 34 of RF transceiver and IR transmitter combination device 30. As shown in FIG. 2, RF transceiving device 100 includes power interface 110, input/output (I/O) interface 112, microcontroller 114, memory 116, RF transceiver 118, antenna 120, and interconnecting communication bus 130. These elements may be of any type well known in the art. As described above, RF transceiving device 100 may also include a microphone contained therein for relaying vocal instructional data between RF transceiving device 100, a computer, and/or an RF transceiver and IR transmitter combination device by any well known voice recognition technique and/or protocol.

Power interface 110 is configured to enable RF transceiving device 100 to be powered from an external power source, such as utility power or the like, via cable interconnection or the like (such as by receiving power from computer 10 via cable 22 in FIG. 1 or the like). I/O interface 112 is configured to enable a user to interface RF transceiving device 100 with other devices. RF transceiver 118 is configured to establish two-way communication between RF transceiver 118 and another RF transceiver, such as an RF transceiver in an RF transceiver and IR transmitter combination device of the invention, by way of antenna 120.

Microcontroller 114 reads and processes computer readable program code means stored in memory 116 of RF transceiving device 100 or provided by an external memory device, and causes microcontroller 114 to perform programmed functions. Movement and process of instructions as well as data is controlled and accomplished by microcontroller 114 of RF transceiving device 100.

Any computer readable software code means stored in memory 116 of RF transceiving device 100 or provided by an external memory device may include: seventh instruction means for receiving processed accessed command code data from a computer communicatively interconnected with RF transceiving device 100; eighth instruction means for receiving verbal input data regarding a particular home entertainment unit from an input device via vocal recognition circuitry, and processing the received verbal input data into processed access command code data for the associated home entertainment unit; ninth instruction means for converting processed accessed command code data from a computer communicatively interconnected with RF transceiving device 100 into RF signal data associated with a particular home entertainment unit; and tenth instruction means for transmitting the RF signal data.

Figure 3:
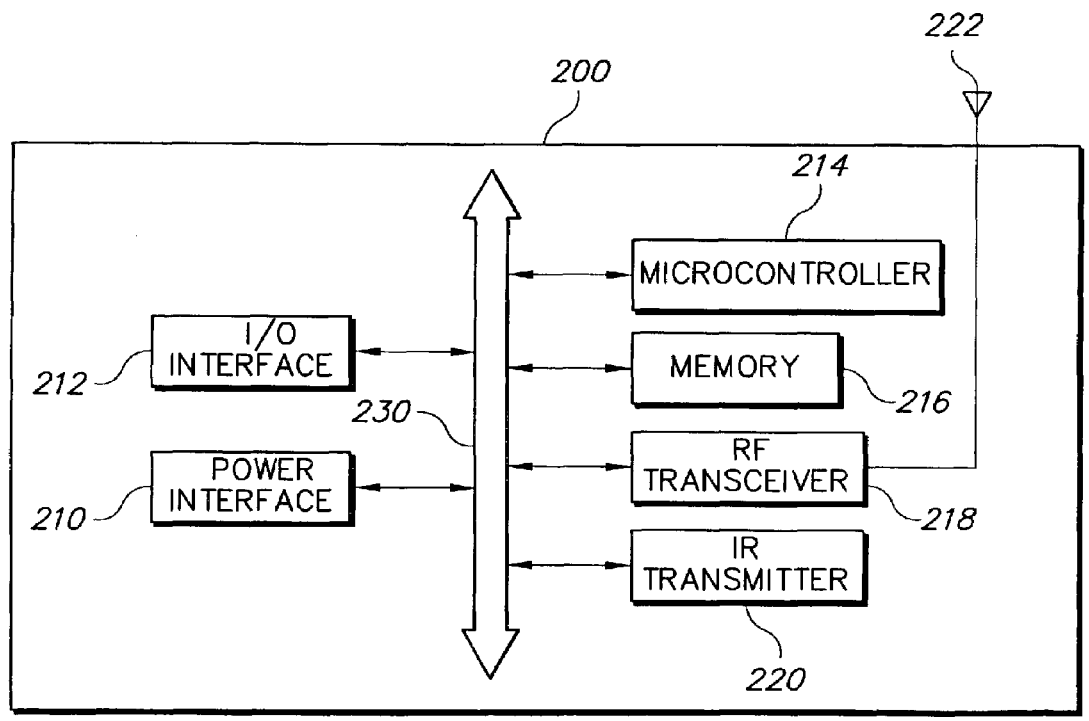
FIG. 3 is a block diagram of an RF transceiver and IR transmitter combination device according to the present invention.

RF transceiver and IR transmitter combination device 30 is wirelessly communicatively linked with RF transceiving device 20 via antenna 34 of RF transceiver and IR transmitter combination device 30 and antenna 24 of RF transceiving device 20. As shown in FIG. 3, RF transceiver and IR transmitter combination device 200 includes power interface 210, I/O interface 212, microcontroller 214, memory 216, RF transceiver 218, IR transmitter 220, antenna 222, and interconnecting communication bus 230. These elements may be of any type well known in the art. As described above, RF transceiver and IR transmitter combination device 200 may also include a microphone contained therein for relaying vocal instructional data between RF transceiver and IR transmitter combination device 200, a computer, and/or an RF transceiving device by any well known voice recognition technique and/or protocol.

Power interface 210 is configured to enable RF transceiver and IR transmitter combination device 200 to be powered from an external power source, such as utility power or the like, via cable interconnection or the like (such as by receiving power from utility power from a wall outlet via cable 32 in FIG. 1 or the like). I/O interface 210 is configured to enable a user to interface RF transceiver and IR transmitter combination device 210 with other devices. RF transceiver 218 is configured to establish two-way communication between RF transceiver 218 and another RF transceiver, such as an RF transceiver in an RF transceiving device of the invention, by way of antenna 222. IR transmitter 220 is configured to transmit IR signals using transmission element 36 to control any number of home entertainment units.

Microcontroller 214 reads and processes computer readable program code means stored in memory 216 of RF transceiver and IR transmitter combination device 200 or provided by an external memory device, and causes microcontroller 214 to perform programmed functions. Movement and process of instructions as well as data is controlled and accomplished by microcontroller 214 of RF/IR transceiver/transmitter combination device 200.

Any computer readable software code means stored in memory 216 of RF transceiver and IR transmitter combination device 200 or provided by an external memory device may include: eleventh instruction means for receiving RF signal data associated with a particular home entertainment unit; twelfth instruction means for receiving verbal input data regarding a particular home entertainment unit from an input device via vocal recognition circuitry, and processing the received verbal input data into received RF signal data for the associated home entertainment unit; thirteenth instruction means for converting received RF signal data associated with a particular home entertainment unit into IR signal data associated with the particular home entertainment unit; and fourteenth instruction means for transmitting IR signal data associated with the particular home entertainment unit to control the particular home entertainment unit.

A method for controlling home entertainment units with RF and IR signals provides a first input window image on a display for obtaining data regarding operation of a home entertainment unit; receives input data from the first input window via an input device regarding a particular home entertainment unit; receives input data verbally from an input device via vocal recognition circuitry, the input data regarding a particular home entertainment unit; accesses command code data about the particular home entertainment unit associated with the received input data; processes accessed command code data the particular home entertainment unit associated with the received input data; and transfers the processed accessed command code data to an RF transceiving device communicatively interconnected with the computer.

The method then receives processed accessed command code data from a computer communicatively interconnected with the RF transceiving device; converts processed accessed command code data from a computer communicatively interconnected with the RF transceiving device into RF signal data associated with a particular home entertainment unit; and transmits the RF signal data.

The method then receives RF signal data associated with a particular home entertainment unit, or receives verbal input data regarding a particular home entertainment unit from an input device via vocal recognition circuitry, and processes the received verbal input data into received RF signal data for the associated home entertainment unit; converts received RF signal data associated with a particular home entertainment unit into IR signal data associated with the particular home entertainment unit; and transmits IR signal data associated with the particular home entertainment unit to control the particular home entertainment unit.

While the invention has been described with references to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

We claim:

1. A system for controlling home entertainment units with radio frequency (RF) and infrared (IR) signals, said system comprising:

a computer with a processor, memory, a display, and a disk drive;

an RF transceiving device with a memory, said RF transceiving device being communicatively interconnected with the computer by a cable;

wherein said memory of said RF transceiving device contains stored therein computer readable software code means, said computer readable software code means comprising:

first instruction means for receiving first processed accessed command code data associated with a first input device from the computer;

second instruction means for receiving verbal input data regarding the particular home entertainment unit from a second input device via vocal recognition circuitry, and processing the received verbal input data into second processed access command code data for the particular home entertainment unit;

third instruction means for converting the first or second processed accessed command code data into RF signal data associated with the particular home entertainment unit; and fourth instruction means for transmitting the RF signal data from the RF transceiving device;

an RF transceiver and IR transmitter combination device with a memory, said combination device being wirelessly communicatively linked with the RF transceiving device; and at least one home entertainment unit, wherein said RF transceiver and IR transmitter combination device receives transmitted RF signal data from said RF transceiving device for a particular home entertainment unit, converts the RF signal data into IR signal data associated with the particular home entertainment unit, transmits the IR signal data to the particular home entertainment unit, and controls the particular home entertainment unit.

2. The system according to claim 1, further comprising at least one microphone interconnected with the computer.

3. The system according to claim 1, wherein said memory of said computer contains stored therein computer readable software code means, said computer readable software code means comprising:

fifth instruction means for providing a first input window image on the display for obtaining data regarding operation of the particular home entertainment unit;

sixth instruction means for receiving first input data from the first input window via a first input device regarding the particular home entertainment unit;

seventh instruction means for receiving second input data verbally from a second input device via vocal recognition circuitry, the second input data regarding the particular home entertainment unit;

eight instruction means for accessing command code data about the particular home entertainment unit associated with the received first or second input data;

ninth instruction means for processing the accessed command code data for the particular home entertainment unit associated with the received first or second input data into first processed access command code data; and tenth instruction means for transferring the first processed accessed command code data to the RF transceiving device.

4. The system according to claim 1, wherein said memory of said RF transceiver and IR transmitter combination device contains stored therein computer readable software code means, said computer readable software code means compnsing:

fifth instruction means for receiving first RF signal data regarding the particular home entertainment unit from the RF transceiving device;

sixth instruction means for receiving verbal input data regarding the particular home entertainment unit from an input device via vocal recognition circuitry, and processing the received verbal input data into received second RF signal data regarding the particular home entertainment unit;

seventh instruction means for converting the received first or second RF signal data into IR signal data associated with the particular home entertainment unit; and eight instruction means for transmitting the IR signal data associated with the particular home entertainment unit to control the particular home entertainment unit.

5. A computer useable medium with computer readable software code means stored therein, said computer readable software code means comprising:

first instruction means for providing a first input window image on a display of a computer for obtaining data regarding operation of a particular home entertainment unit, the computer having a processor, memory, and a disk drive;

second instruction means for receiving first input data from the first input window via a first input device, the received first input data regarding a particular home entertainment unit;

third instruction means for receiving second input data verbally from a second input device via vocal recognition circuitry, the received second input data regarding a particular home entertainment unit;

fourth instruction means for accessing command code data about the particular home entertainment unit associated with the received first or second input data;

fifth instruction means for processing accessed command code data the particular home entertainment unit associated with the received first or second input data into first processed access command code data;

sixth instruction means for transferring the first processed accessed command code data to a radio frequency (RF) transceiving device communicatively interconnected with the computer;

seventh instruction means for receiving the first processed accessed command code data from the computer communicatively interconnected with the RF transceiving device;

eighth instruction means for converting the first processed accessed command code data from a computer communicatively interconnected with the RF transceiving device into first RF signal data associated with the particular home entertainment unit;

ninth instruction means for receiving verbal input data regarding the particular home entertainment unit from a second input device via vocal recognition circuitry, and processing the received verbal input data into second RF signal data for the associated home entertainment unit; and tenth instruction means for transmitting the first or second RF signal data.

6. The computer useable medium according to claim 5, wherein said computer readable software code means further comprises:

eleventh instruction means for receiving first or second RF signal data, the received first or second RF signal data being associated with the particular home entertainment unit;

twelfth instruction means for receiving verbal input data regarding the particular home entertainment unit from a second input device via vocal recognition circuitry, and processing the received verbal input data into received second RF signal data for the particular home entertainment unit;

thirteenth instruction means for converting the received first or second RF signal data associated with a particular home entertainment unit into infrared (IR) signal data associated with the particular home entertainment unit; and fourteenth instruction means for transmitting IR signal data associated with the particular home entertainment unit to control the particular home entertainment unit.

7. A method for controlling home entertainment units with radio frequency (RF) and infrared (IR) signals, said method comprising:

providing a first input window image on a display of a computer for obtaining data regarding operation of a particular home entertainment unit, the computer having a processor, memory, and a disk drive;

receiving first input data from the first input window via a first input device, the received first input data regarding a particular home entertainment unit;

receiving second input data verbally from a second input device via vocal recognition circuitry, the received second input data regarding a particular home entertainment unit;

accessing command code data about the particular home entertainment unit associated with the received first or second input data;

processing the accessed command code data about the particular home entertainment unit particular with the received first or second input data into first processed access command code data;

transferring the first processed accessed command code data to an RF transceiving device communicatively interconnected with the computer;

receiving first RF signal data, the received first RF signal data being associated with the particular home entertainment unit;

processing the verbal input data received from the second input device into received second RF signal data associated with the particular home entertainment unit;

converting the received first or second RF signal data associated with the particular home entertainment unit into IR signal data associated with the particular home entertainment unit; and transmitting IR signal data associated with the particular home entertainment unit to control the particular home entertainment unit.

* * * * *